Feb. 16, 1971 J. V. TROYANKIN ET AL 3,563,722
GLASS-MELTING FURNACE
Filed April 17, 1968

3,563,722
GLASS-MELTING FURNACE

Jury Vasilievich Troyankin, Golianove, korp. 28, kv. 32; Boris Alexandrovich Sokolov, Derevnya Khimki 1; Vera Vasilievna Poliyak, B. Semenovskaya ul. 29/2, kv. 47; Yakov Vasilievich Timoshkov, Lenisky prospekt 64, kv. 62; Vadim Alexandrovich Chubinidze, Universitetsky prospekt 6, korp. 4, kv. 88; Ippolit Ilich Kuksin, B. Tulskaya ul. 54, korp. 2, kv. 73; and Ninel Pavlovna Merezhnikova, Ul. letchinka Babshikina 12, kv. 23, all of Moscow, U.S.S.R.; Jury Alexandrovich Knyazev, Bor-3, ul. Shkolnaya 1, kv. 16, Gorky, U.S.S.R.; Nikolai Pavlovich Kabanov, Nizhanaya Maslovka 6, kv. 8, Moscow, U.S.S.R.; and Mikhail Ivanovich Popov, Bor-3, ul. Shkolnaya 9, kv. 7; Dmitry Nikolaevich Shepelev, Bor-3, ul. Myakovskogo 1, kv. 3; and Vera Yakovlevna Starostina, Bor-3, ul. Myakovskogo 1, kv. 21, all of Gorky, U.S.S.R.

Filed Apr. 17, 1968, Ser. No. 722,105
Int. Cl. C03b 3/00
U.S. Cl. 65—335
10 Claims

ABSTRACT OF THE DISCLOSURE

A glass melting apparatus comprises a cylindrical chamber provided with a plurality of burners tangentially disposed relative to the chamber, the burners being simultaneously supplied with a charged mixture, fuel, and gas. The outlet portion at the bottom of the chamber conically flares outwardly and downwardly. The apparatus is further provided with a tank having homogenization, clarification and cooling zones, the conically flared outlet portion of the chamber extending into the tank and being vertically spaced from the maximum level of molten product in the tank.

---

The present invention relates to glass-melting installations.

Currently known are glass-melting installations comprising a cylindrical chamber with burners arranged tangentially along the perimeter of its top portion to supply a fuel-and-air mixture, as well as a reception tank for the homogenization, clarification and cooling of glass melt (cf. the description of the U.S.S.R. Inventor's Certificate No. 149,546, Cl. 32a, 4).

The essence of the invention "cyclone glass-melting furnace" disclosed in the U.S.S.R. Author's Certificate No. 149,546 is that in the cyclone glass-melting furnace with tangentially arranged burners in the top portion and a charging hole for batch in the dome, said hole communicating in the bottom portion with a horizontal basin for homogenization, cooling and processing of glass melt, the inner walls of the furnace in contact with the glass mass are made from metallic pipes, the cooling basin being provided with holes for flowing into the dome the air accelerating the glass mass. In addition, the furnace is provided with a potutilizer.

Glass melt produced in such installation is not homogenous in its composition, since the multi-component glass mixture, when charged through the chamber arch, becomes heavily stratified.

The composition of the thus produced glass melt differs from the rated one, because some of $Na_2O$ is carried away by smoke gases.

Concurrently, hard-melting incrustation may develop, which adversely affects the normal operational process.

The glass melt fed to the tank from a cyclone chamber normally comprises inclusions of unmolten particles of hard-melting components of the charged mixture (silicon dioxide, pegmatite, etc.) and, therefore, requires further treatment and homogenization in the tank.

Moreover, a high-temperature whirl of waste gases carries particles of dust-like mixture and catches drops of molten glass which are thrown onto the arch and walls of the tank within the homogenization area.

As a result, intensive destruction of fire-proof members of the arch and walls of the tank takes place in the known cyclone glass-melting installations, which fact reduces the installation service life and adversely affects the quality of glass produced.

It is an object of the present invention to eliminate the afore-mentioned disadvantages.

The primary object of the invention is to provide a glass-melting installation permitting the production of high quality glass melt with maximum utilization of mechanical and thermal energy of hot gases in the cyclone chamber.

The object of the invention has been achieved by providing a glass-melting installation comprising a cyclone chamber for melting the charged mixture, with burners to effect the supply of a fuel-and-gas mixture arranged tangentially along the perimeter of the top portion of said chamber, as well as a tank positioned beneath said cyclone chamber for the homogenization, clarification and cooling of glass melt, wherein, according to the invention, each of the burners is provided with at least one branch pipe to effect a simultaneous supply of the charged mixture and a fuel-and-gas mixture, through the burner nozzle, into the cyclone chamber whose bottom portion is conical, flaring outwardly downward, said burner being lowered into the tank and positioned above the glass melt level.

The present invention effects a reduction in fuel consumption and prolonged service life of the installation.

Moreover, the proposed glass-melting installation effects the production of a glass melt having a homogeneous composition.

This is achieved owing to the provision of a simultaneous supply of a charged mixture and a fuel-and-gas mixture tangentially with respect to the inner surface of the cyclone chamber, whereby said mixture, on issuing from the burner nozzles, immediately passes into the chamber walls with no time left for stratification.

The invention will be more apparent from the description of an exemplary embodiment of a glass-melting installation and the appended drawings, wherein.

Figure 1:
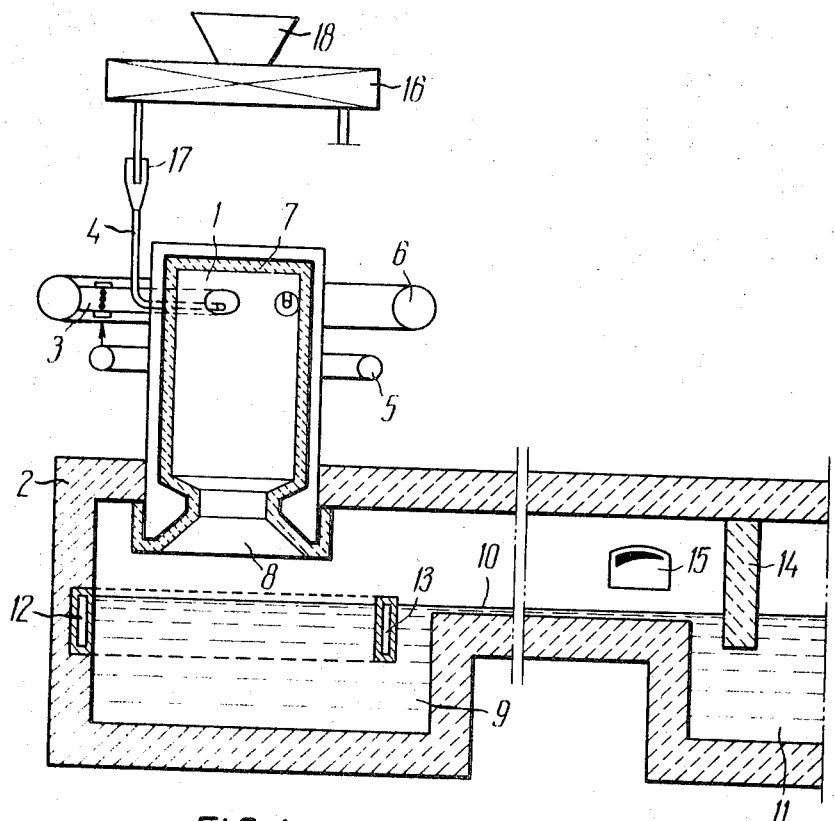
FIG. 1 is a cross section of the glass-making installation.
Figure 2:
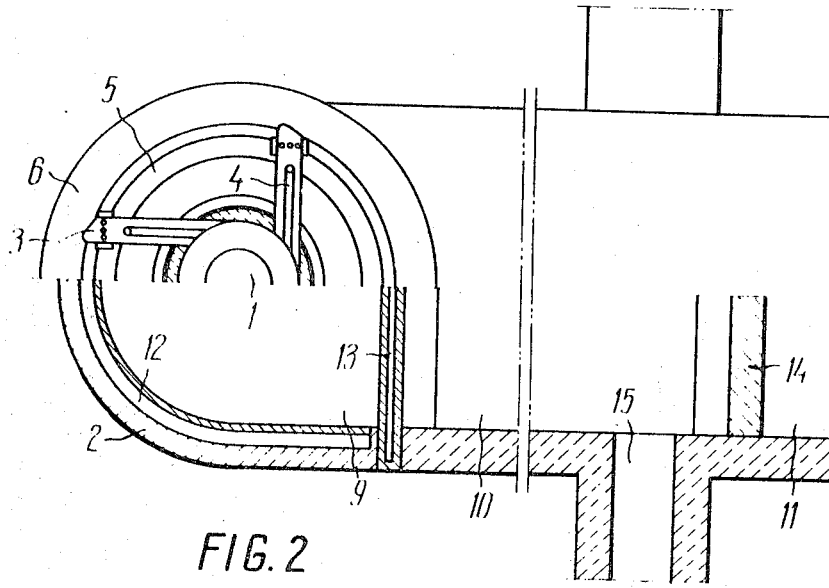
FIG. 2 is a top view of the installation of FIG. 1.

A glass-melting installation shown in the drawings has a vertical cylindrical cyclone chamber 1 (FIGS. 1 and 2) with water-cooled walls or jacket and a tank 2 for the homogenization, and clarification of the glass melt.

The vertical cylindrical cyclone chamber 1 with its water-cooled walls is provided with four burners 3 arranged tangentially along the perimeter of the top portion of said chamber. Fed to these burners through pipes 4, 5 and 6 are respectively charge, fuel and air.

Each of the burners 3 is fitted with a branch pipe 7 for the simultaneous supply of the charged mixture and the fuel-and-gas mixture into the cyclone chamber 1 through the nozzle of burner 3.

The bottom portion or funnel 8 of the cyclone chamber 1 is conical, flaring outwardly downward and is so positioned into the tank 2 such that a gap $a$ between its lower edge and the upper level of the glass melt provides for intensive mixing of the glass melt by the whirl of waste gases.

The tank 2 consists of zones 9, 10 and 11 intended respectively for the homogenization, clarification and cooling of the glass melt. The side walls of the tank 2 in the vicinity of the funnel 8 have a water-cooling duct 12 serving to prevent the tank walls against the destroying action of the glass melt.

The homogenization zone 9 is separated from the clarification zone 10 by means of a water-cooled partition 13, while the clarification zone 10 is separated from the glass melt cooling zone 11 in the tank 2 by means of a partition 14. Waste gases are removed through a smoke flue 15.

The installation described hereinabove operates as described below.

The charge fed through the pipe 4 to the burners 3 is supplied together with the fuel-and-gas mixture via the nozzles of said burners into the cyclone chamber 1, wherein the particles of the charge are picked up by a descending high-temperature whirl formed by flames, thrown back by centrifugal force onto the walls of the chamber 1, become molten and pass as the melt to the homogenization zone 9 of the tank 2.

The whirl of gases escaping from the bottom portion 8 of the cyclone chamber 1 ensures intensive mixing of the glass melt in the homogenization zone 9 of the tank 2, thus facilitating the production of homogenous glass melt.

From the homogenization zone 9 of the tank 2, said glass melt passes to the clarification zone 10 wherein the process takes place in a thin layer. The partition 13 restricts the penetration of the surface layer of the glass melt into the clarification zone 10 from the homogenization zone 9.

The medium of waste gases and the top layer of the glass melt of the cooling zone 11 and the clarification zone 10 are separated, which fact helps ensure varying gas conditions and homogeneity of the glass melt being cooled.

The outgoing gases flow over the glass melt surface, yielding some heat thereto, and are removed through the smoke flue 15.

What we claim is:

1. A glass-melting apparatus comprising a housing including a cylindrical wall defining a chamber, said housing including an upper portion and a lower portion, a plurality of spaced burners connected to said housing at the upper portion thereof, each of said burners including an outlet portion communicating tangentially with said chamber, first channel means connected to each of said burners for supplying thereto a charged mixture, second channel means connected to each of said burners for supplying thereto a fuel, third channel means connected to each of said burners for supplying thereto a gas, said first, second, and third channel means cooperating simultaneously for supplying said charged mixture, said fuel, and said gas to said burners simultaneously, said lower portion of said housing including a conical outlet portion outwardly flaring downwardly, and a tank connected to said conical outlet portion of said housing, said tank including respective means for the homogenization, clarification and cooling of a molten product issuing from said conical outlet portion of said housing, said tank including means for maintaining said molten product at a maximum level, said conical outlet portion of said housing being vertically spaced from said maximum level of said molten product.

2. Apparatus as claimed in claim 1 wherein said housing includes cooling means for cooling said housing.

3. Apparatus as claimed in claim 2 wherein said cooling means includes a cylindrical jacket surrounding said housing.

4. Apparatus as claimed in claim 1 wherein said tank includes a cooling partition separating said means for homogenization from said means for clarification of said molten product.

5. Apparatus as claimed in claim 4 wherein said tank includes a partition separating said means for clarification from said means for cooling said molten product.

6. Apparatus as claimed in claim 5 wherein said tank includes a bottom, said partitions extending vertically and being vertically spaced from said tank bottom, said partitions thereby acting to separate the surface of said molten product between said respective homogenization, clarification, and cooling means.

7. Apparatus as claimed in claim 1, wherein said outlet portion of each of said burners opens into said chamber flush with said cylindrical wall thereby providing said chamber with a cylindrical space free of interfering protruding elements.

8. Apparatus as claimed in claim 1, wherein said housing at said upper portion thereof includes an end cover plate, said burners being constituted as the sole means through which said charged mixture, said fuel, and said gas pass into said chamber.

9. Apparatus as claimed in claim 1, including a reduced cylindrical portion interposed between said conical outlet portion and said chamber of said housing.

10. Apparatus as claimed in claim 9, wherein said conical outlet portion of said housing includes an upper end portion of reduced diameter corresponding and connected to said reduced cylindrical portion.

References Cited
UNITED STATES PATENTS
3,443,921  5/1969  Boivent _____ 65—134

ARTHUR D. KELLOGG, Primary Examiner

U.S. Cl. X.R.

65—135, 347